(12) United States Patent
Emmons

(10) Patent No.: US 10,690,205 B2
(45) Date of Patent: *Jun. 23, 2020

(54) DRUM BRAKE DEVICE AND METHOD OF ASSEMBLY

(71) Applicant: AUTOKINETICS, INC., Troy, MI (US)

(72) Inventor: J. Bruce Emmons, Beverly Hills, MI (US)

(73) Assignee: AUTOKINETICS, INC., Troy, MI (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/107,179

(22) Filed: Aug. 21, 2018

(65) Prior Publication Data

US 2018/0355934 A1 Dec. 13, 2018

Related U.S. Application Data

(63) Continuation-in-part of application No. 15/321,225, filed as application No. PCT/US2015/038928 on Jul. 2, 2015, now Pat. No. 10,054,177.

(Continued)

(51) Int. Cl.
*F16D 65/22* (2006.01)
*F16D 51/24* (2006.01)
(Continued)

(52) U.S. Cl.
CPC ............. *F16D 65/22* (2013.01); *F16D 51/12* (2013.01); *F16D 51/22* (2013.01); *F16D 51/24* (2013.01);
(Continued)

(58) Field of Classification Search
CPC ........ F16D 65/09; F16D 65/827; F16D 51/10; F16D 51/22; F16D 2065/788;
(Continued)

(56) References Cited

U.S. PATENT DOCUMENTS 2,161,640 A 6/1939 Schnell
2,184,050 A 12/1939 Miler
(Continued)

FOREIGN PATENT DOCUMENTS

DE 3612398 A1 10/1987
FR 2235026 A1 1/1975
(Continued)

OTHER PUBLICATIONS

International Search Report and Written Opinion of the International Searching Authority for International application No. PCT/US2015/038928 dated Oct. 14, 2015.
(Continued)

*Primary Examiner* — Thomas J Williams
(74) *Attorney, Agent, or Firm* — Carlson, Gaskey & Olds

(57) ABSTRACT

An illustrative example drum brake device includes a drum having an inner, braking surface. At least one brake shoe includes a friction lining and a support structure for the friction lining. The support structure includes a window having a first portion that is wider than a second portion. A shoe mount is configured to be received through the first portion of the window and engage the support structure adjacent the second portion of the window in a manner that resists movement of the brake shoe in two dimensions and allows selective movement of the brake shoe in a third dimension for allowing the friction lining to selectively engage the braking surface.

18 Claims, 17 Drawing Sheets

Related U.S. Application Data

(60) Provisional application No. 62/166,185, filed on May 26, 2015, provisional application No. 62/020,066, filed on Jul. 2, 2014.

(51) Int. Cl.

| | | |
|---|---|---|
| *F16D 65/08* | (2006.01) | |
| *F16D 51/14* | (2006.01) | |
| *F16D 51/12* | (2006.01) | |
| *F16D 51/22* | (2006.01) | |
| *F16D 65/09* | (2006.01) | |
| F16D 125/62 | (2012.01) | |
| F16D 121/14 | (2012.01) | |
| F16D 51/00 | (2006.01) | |
| F16D 121/04 | (2012.01) | |
| F16D 125/60 | (2012.01) | |

(52) U.S. Cl.
CPC ............ *F16D 65/08* (2013.01); *F16D 65/09* (2013.01); *F16D 2051/003* (2013.01); *F16D 2121/04* (2013.01); *F16D 2121/14* (2013.01); *F16D 2125/60* (2013.01); *F16D 2125/62* (2013.01)

(58) Field of Classification Search
CPC ..... F16D 2065/1328; F16D 2065/1322; F16D 2250/0046; F16D 2250/0084; F16D 2051/003; F16D 2200/0039; F16D 2200/0017
See application file for complete search history.

(56) References Cited

U.S. PATENT DOCUMENTS

| | | |
|---|---|---|
| RE21,380 E | 3/1940 | Brie |
| 2,197,452 A | 4/1940 | Fussell, Jr. |
| 2,207,421 A | 7/1940 | Tirabasso |
| 2,347,571 A | 4/1944 | Linke |
| 2,389,405 A | 11/1945 | Birchfield |
| 2,587,831 A | 3/1952 | Frick |
| 3,708,044 A * | 1/1973 | Torri ...................... F16D 51/24 188/326 |
| 6,729,449 B1 | 5/2004 | Doolittle et al. |
| 7,249,660 B2 | 7/2007 | Mackiewicz |
| 8,181,753 B2 | 5/2012 | Levering et al. |
| 8,215,459 B2 | 7/2012 | Peasley et al. |
| 10,054,177 B2 * | 8/2018 | Emmons ............... F16D 65/827 |

FOREIGN PATENT DOCUMENTS

| | | |
|---|---|---|
| FR | 2938313 A1 | 5/2010 |
| WO | 2005/077723 A1 | 8/2005 |

OTHER PUBLICATIONS

International Preliminary Report on Patentability for PCT Application No. PCT/US2015/038928 dated Jan. 12, 2017.

* cited by examiner

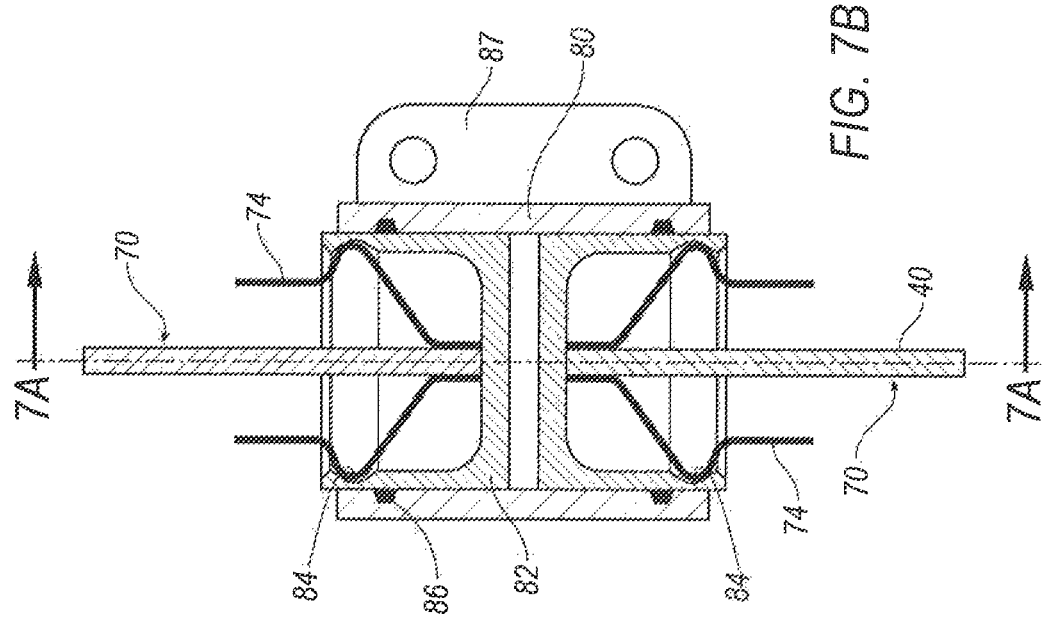
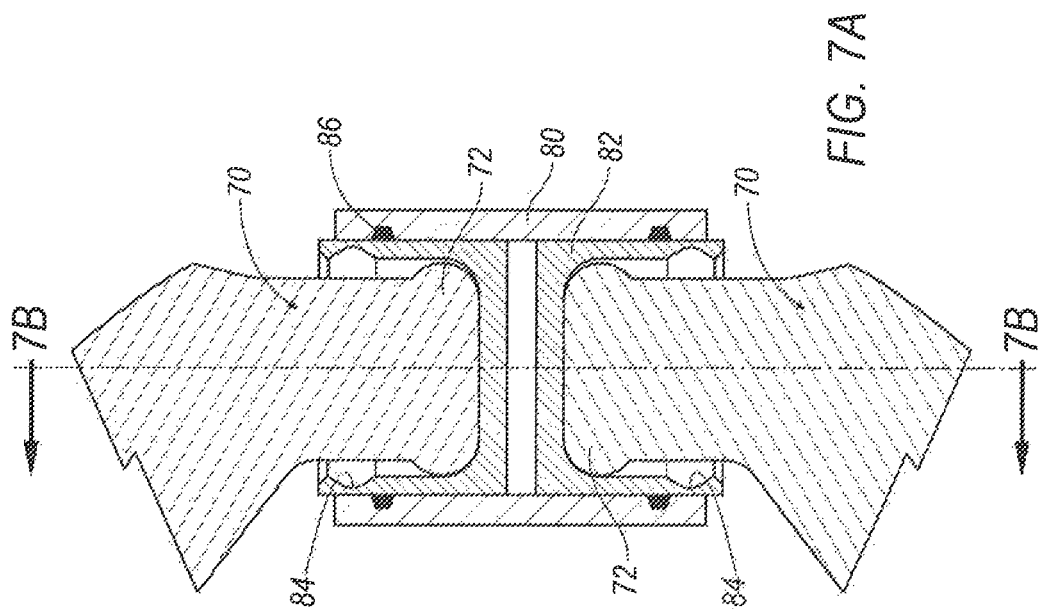

DRUM BRAKE DEVICE AND METHOD OF ASSEMBLY

BACKGROUND

Automotive vehicles include brakes associated with the wheels for controlling movement of the vehicle. For many years drum brakes have been used. Disc brakes are also well known.

A typical configuration of a drum brake device includes two brake shoes that are forced outwardly against an inner surface of a drum. While drum brakes typically function reasonably well, they present challenges during assembly and service because of the relatively large number of springs, clips, linkages and adjusters that are used to hold the brake shoes in position.

Three known types of drum brakes include the duo-servo brake, the two leading shoe brake (also known as the duplex brake) and the leading/trailing brake (also known as the simplex brake). The principle differences among these three drum brake types are the way in which the brake torque reaction is handled by the brake shoes. An anchor pin or abutment located at the leading edge of the shoe takes the torque reaction in the individual leading shoe arrangement. The trailing shoe arrangement, by contrast, has an anchor pin at the trailing end of the shoe. In a duo-servo brake, both shoes act in series on a single abutment at the leading end of one of the shoes.

In all of the drum brake geometries described above, some level of self-excitation occurs. The brake application force may be amplified by the generation of tangential braking forces on the surface of the brake lining. While self-excitation was useful before power assisted brake systems were introduced, there may be disadvantages to a self-excited brake geometry. Greater sensitivity to changes in the coefficient of friction of the brake lining may be a disadvantage. Duo-servo brakes, in particular, have been known to experience brake fade associated with such changes. Also, a self-excited brake geometry tends to aggravate brake noise such as squeal.

By contrast, disc brakes typically are configured to apply forces perpendicular to the braking surface and the reaction forces are parallel to the braking surface. Disc brakes typically do not experience an amplification effect and have less sensitivity to variations in the coefficient of friction. Disc brakes, however, generally require some form of power assist. While disc brake arrangements usually avoid the fade resistance characteristic of some drum brakes, disk brakes tend to be more expensive.

SUMMARY

A drum brake assembly designed according to an embodiment of this invention includes brake shoes having assembly features that facilitate secure placement of the brake shoes in a quick, efficient and straight-forward manner. Embodiments of this invention eliminate the otherwise relatively complex components that have typically been associated with drum brake devices.

An illustrative example method of assembling a drum brake device includes positioning a portion of a brake shoe support structure near an opening of a brake actuating cylinder; manipulating the support structure so that a window of the support structure is received over a portion of a shoe mount; moving the support structure relative to the shoe mount so that the portion of the support structure is received into the brake actuating cylinder and the support structure is engaged by the shoe mount in a manner that the shoe mount restricts movement of the brake shoe in two dimensions and allows selective movement in a third dimension; and securing the brake shoe in an installed position by placing the drum over the brake shoe with the braking surface facing the friction lining.

In an example method having one or more features of the method of the previous paragraph, the support structure comprises a table and a web; the friction lining is secured to the table; the web is generally perpendicular to a surface of the friction lining that is configured to contact the braking surface of the drum; the window is on the web; and the portion of the support structure that is positioned adjacent the opening of the brake actuating cylinder is an end of the web.

In an example method having one or more features of the method of any of the previous paragraphs, there are two brake actuating cylinders; there are two ends of the web that are positioned adjacent the opening on the cylinders, respectively; and the two ends of the web are inserted into the cylinders as the web is moved relative to the shoe mount in a direction that is generally perpendicular to the surface of the friction lining.

In an example method having one or more features of the method of any of the preceding paragraphs, the cylinders include pistons configured to move for actuating the brake device; the ends of the web and the pistons include cooperating surfaces for holding the ends of the web inside the pistons; and the cooperating surfaces become engaged during the moving.

In an example method having one or more features of the method of any of the preceding paragraphs, the cooperating surfaces comprise at least one spring clip and at least one groove.

In an example method having one or more features of the method of any of the preceding paragraphs, the at least one spring clip is supported on the web near the end of the web and the at least one groove is on the piston.

In an example method having one or more features of the method of any of the previous paragraphs, manipulating the support structure so that the window is received over a portion of the shoe mount comprises tipping the web toward the shoe mount; and moving the support structure relative to the shoe mount comprises sliding the web over the portion of the shoe mount in a direction that is parallel to a direction of movement of the web for brake application.

In an example method having one or more features of the method of any of the previous paragraphs, the shoe mount comprises an abutment bar including notches; and sliding the web over the portion of the shoe mount comprises positioning portions of the web on opposite sides of the window within the notches.

In an example method having one or more features of the method of any of the previous paragraphs, engagement between the abutment bar and the portions of the web within the notches resists rotational movement of the brake shoe about an axis of rotation of the drum and resists movement of the brake shoe along a direction parallel to the axis of rotation of the drum.

In an example method having one or more features of the method of any of the previous paragraphs, the positioning, manipulating, moving and securing are all done by hand.

In an example method having one or more features of the method of any of the previous paragraphs, the positioning, manipulating, moving and securing are all done without using any tools.

An example method having one or more features of the method of any of the previous paragraphs includes pre-assembling a brake shoe assembly by performing the positioning, the manipulating and the moving; and subsequently installing the pre-assembled brake shoe assembly onto a vehicle suspension component.

An illustrative example drum brake device includes a drum having an inner, braking surface; at least one brake shoe including a friction lining and a support structure for the friction lining, the support structure including a window having a first portion and a second portion, the first portion of the window being wider than the second portion; and a shoe mount that is configured to be received through the first portion of the window, the shoe mount engages the support structure adjacent the second portion of the window in a manner that resists movement of the brake shoe in two dimensions and allows selective movement of the brake shoe in a third dimension for allowing the friction lining to selectively engage the braking surface.

In an example drum brake device having one or more features of the device of the previous paragraph, the shoe mount includes notches; the support structure adjacent each of two sides of the second portion of the window is received in the notches; engagement between the support structure and the notches prevents movement of the brake shoe in a rotational direction corresponding to rotation of the drum; movement in the rotational direction corresponds to movement in one of the two dimensions; engagement between the support structure and the notches prevents movement of the brake shoe in an axial direction parallel to an axis of rotation of the drum; movement in the axial direction corresponds to movement in the other of the two dimensions; and engagement between the support structure and the notches allows movement of the brake shoe in a brake applying direction that corresponds to movement in the third dimension.

In an example drum brake device having one or more features of the device of any of the previous paragraphs, the drum comprises an inner portion and an outer rim; the inner portion has the inner, braking surface; the outer rim includes a plurality of openings that are configured to accommodate air flow through the openings to facilitate reducing a temperature of at least the drum.

In an example drum brake device having one or more features of the device of any of the previous paragraphs, the inner portion comprises a stainless steel stamping; and the outer rim comprises aluminum.

In an example drum brake device having one or more features of the device of any of the previous paragraphs, the drum includes an outer face that includes a plurality of vanes configured to direct air flow toward the openings of the outer rim during rotation of the drum.

In an example drum brake device having one or more features of the device of any of the previous paragraphs, the brake shoe support structure comprises a table and a web; the table and the web comprise stainless steel; and the friction lining comprises a layer of ceramic alumina on the table.

In an example drum brake device having one or more features of the device of any of the previous paragraphs, the layer of ceramic alumina is flame sprayed on to the table.

In an example drum brake device having one or more features of the device of any of the previous paragraphs, the shoe mount comprises an abutment bar, a connector and a torque reaction bracket; the connector is configured to be secured to a suspension component; and the torque reaction bracket comprises four linear load path members that extend between the abutment bar and the connector.

In an example drum brake device having one or more features of the device of any of the previous paragraphs, the shoe mount comprises a central support portion and load path members; the shoe mount comprises two metal stampings that are received against each other in the central support portion and spaced from each other along at least a portion of a length of the load path members.

In an example drum brake device having one or more features of the device of any of the preceding paragraphs, the support structure comprises a table and a web; the friction lining is secured to the table; the web is generally perpendicular to a surface of the friction lining that is configured to contact the braking surface of the drum; and the window is on the web.

In an example drum brake device having one or more features of the device of any of the preceding paragraphs, there are two brake actuating cylinders including pistons configured to move for actuating the brake device; ends of the web that are received into the cylinders, respectively; and the ends of the web and the pistons include cooperating surfaces for selectively holding the ends of the web inside the pistons.

In an example drum brake device having one or more features of the device of any of the preceding paragraphs, the cooperating surfaces comprise at least one spring clip and at least one groove.

In an example drum brake device having one or more features of the device of any of the preceding paragraphs, the at least one spring clip is supported on the web near the end of the web and the at least one groove is on the piston.

An example drum brake device having one or more features of the device of any of the previous paragraphs includes a parking brake actuator that includes at least one lever having an end that urges the brake shoe in a brake application direction to cause engagement between the friction lining and the braking surface.

In an example drum brake device having one or more features of the device of any of the previous paragraphs, the lever has a pivot point spaced inward from ends of the lever; one of the ends moves inward toward a center of the drum based on the lever pivoting about the pivot point during use of the parking brake actuator; and another one of the ends moves the brake shoe outward toward the braking surface based on the lever pivoting about the pivot point during use of the parking brake actuator.

Embodiments of this invention make it possible to guide each brake shoe in a direction that is radial to the brake drum. When this is done, the brake torque is reacted in such a way that there is no amplification effect. This avoids the disadvantages of existing drum brakes in terms of brake fade and brake noise, and results in performance comparable to disk brakes.

Various features and advantages of example embodiments will become apparent to those skilled in the art from the following detailed description. The drawings that accompany the detailed description can be briefly described as follows.

BRIEF DESCRIPTION OF THE DRAWINGS

FIG. 7A is a cross-sectional illustration schematically showing how brake shoe webs are received in a cylinder from a first perspective.

FIG. 7B is a cross-sectional illustration schematically showing the brake shoe webs and cylinder from a second, different perspective.

DETAILED DESCRIPTION

Figure 1:
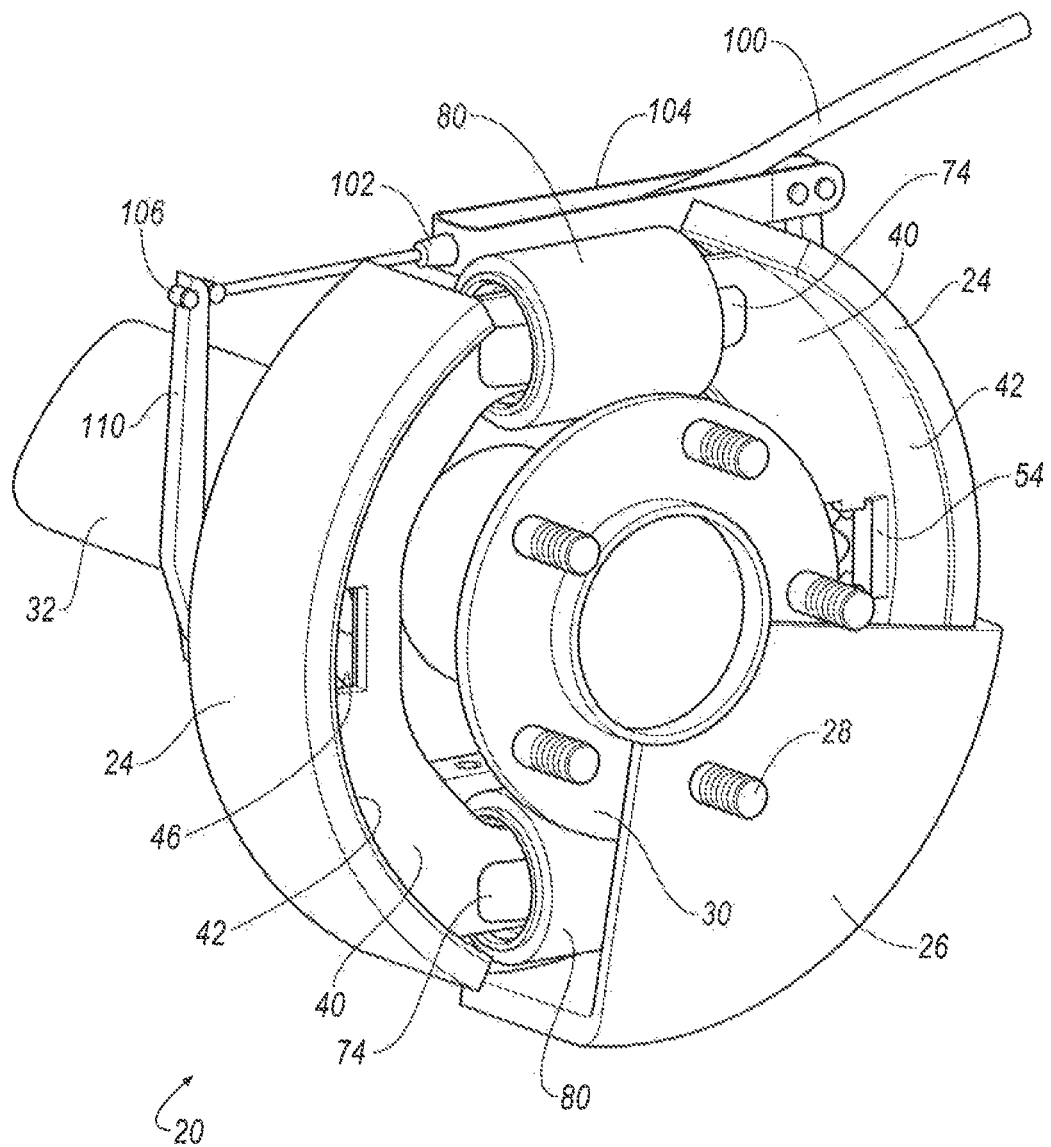
FIG. 1 is a perspective illustration of a drum brake assembly designed according to an embodiment of this invention, in which the drum has been partially cut away.
Figure 2:
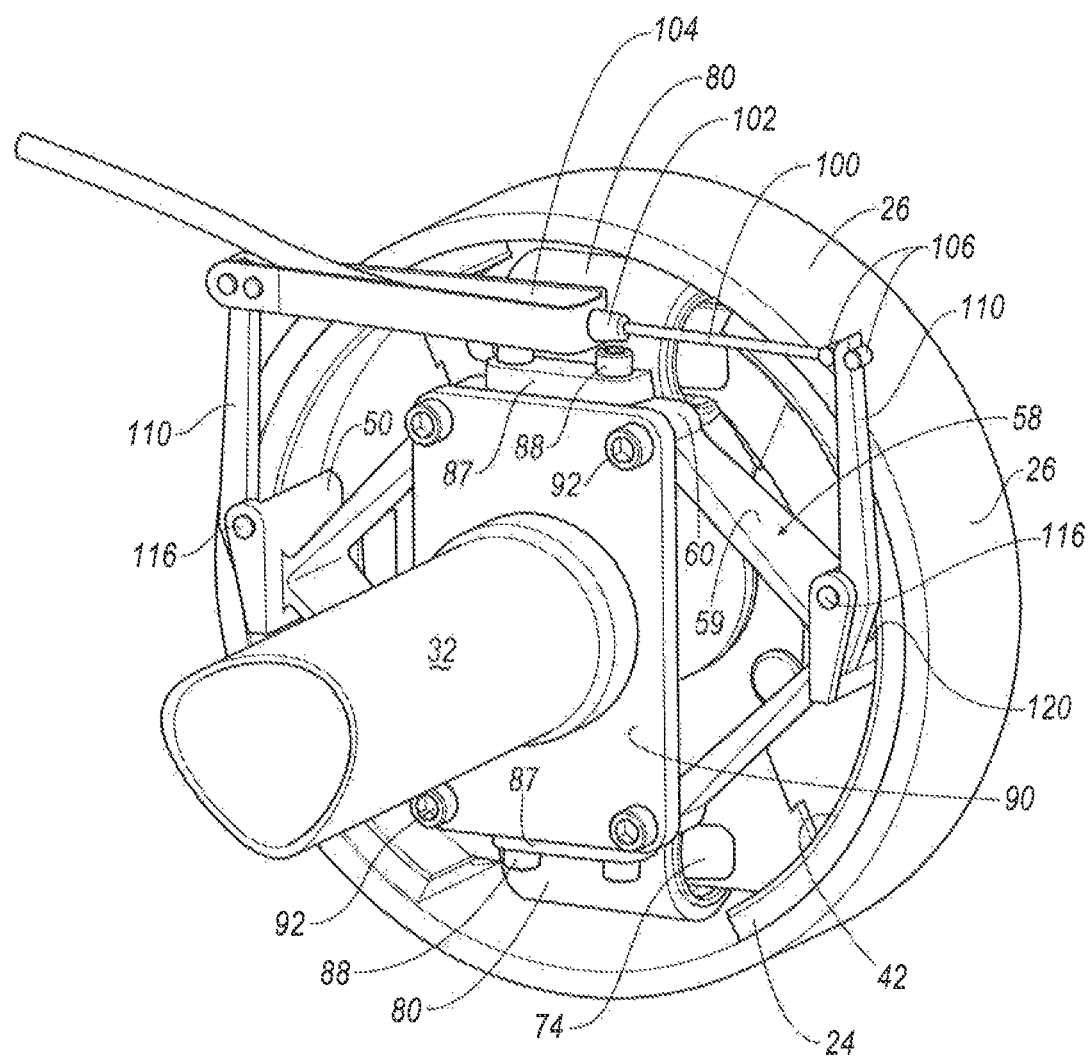
FIG. 2 shows the embodiment of FIG. 1 from another perspective.
Figure 3:
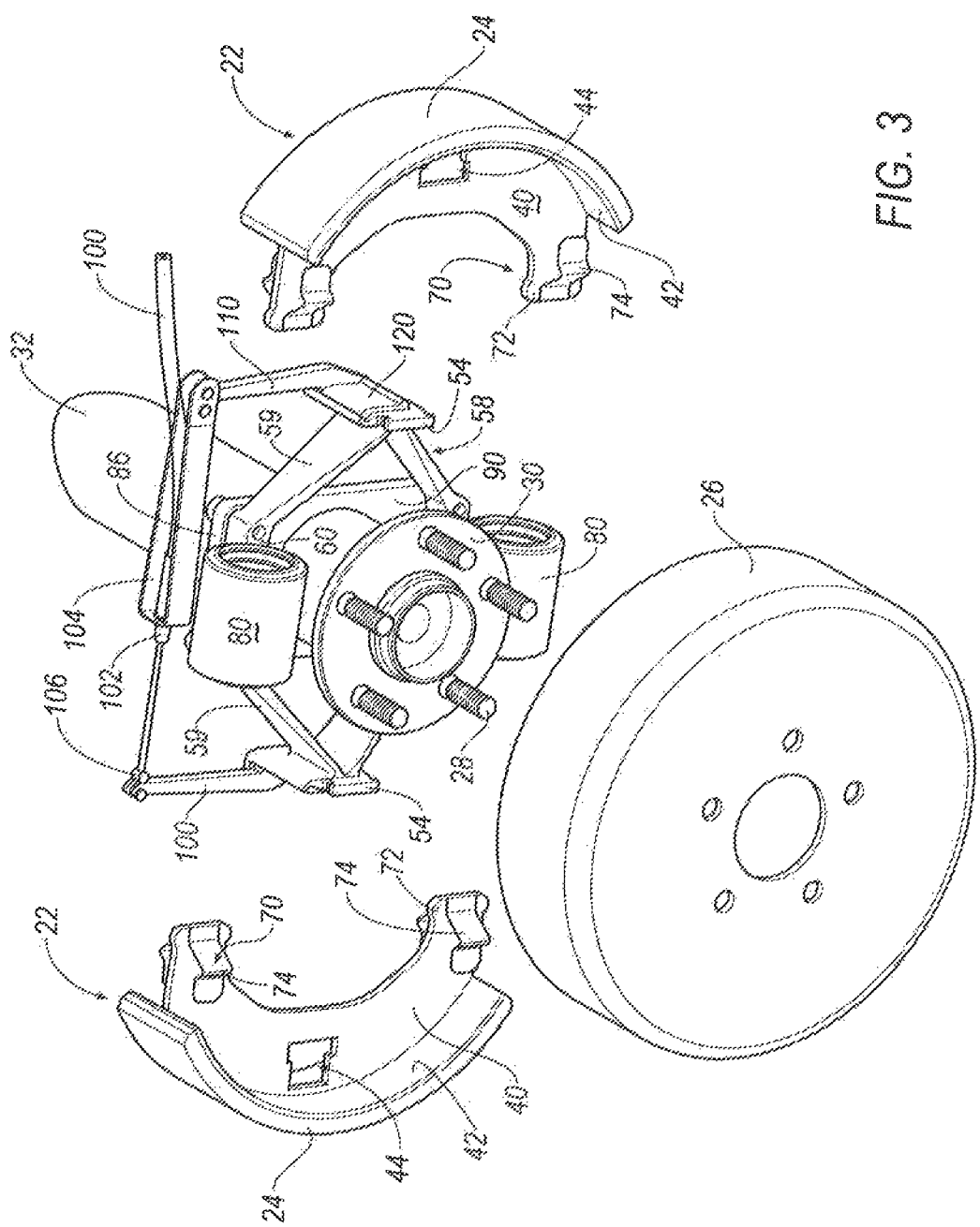
FIG. 3 is a partially exploded view showing selected features of the embodiment of FIGS. 1 and 2.

FIGS. 1 through 3 illustrate various features of an example embodiment of a drum brake device 20. Brake shoes 22 having pads or friction lining material 24 are situated to engage an inside surface on a brake drum 26, which is only partially shown in FIG. 1 to make the illustrated components inside the device 20 visible. The brake drum 26 is associated with a wheel (not illustrated) in a known manner. A plurality of bolts 28 facilitate mounting the brake drum 26 and wheel to a bearing flange 30, which is associated with an axle 32 in a conventional manner.

As can be appreciated from FIGS. 1-4, the brake shoes 22 include a lining or pad support structure, which in this example includes a web 40 and a table 42 that supports the brake lining material 24. The web 40 includes a window or cut-out 44 situated centrally between opposite ends of the web 40. In this example, the window 44 is centered on the web 40. The window 44 has two sections of different dimension. A first section 46 is wider compared to a second section 48. The wider section 46 is positioned more toward an axis of rotation of the wheel when the drum brake is assembled in an operative position.

Figure 5:
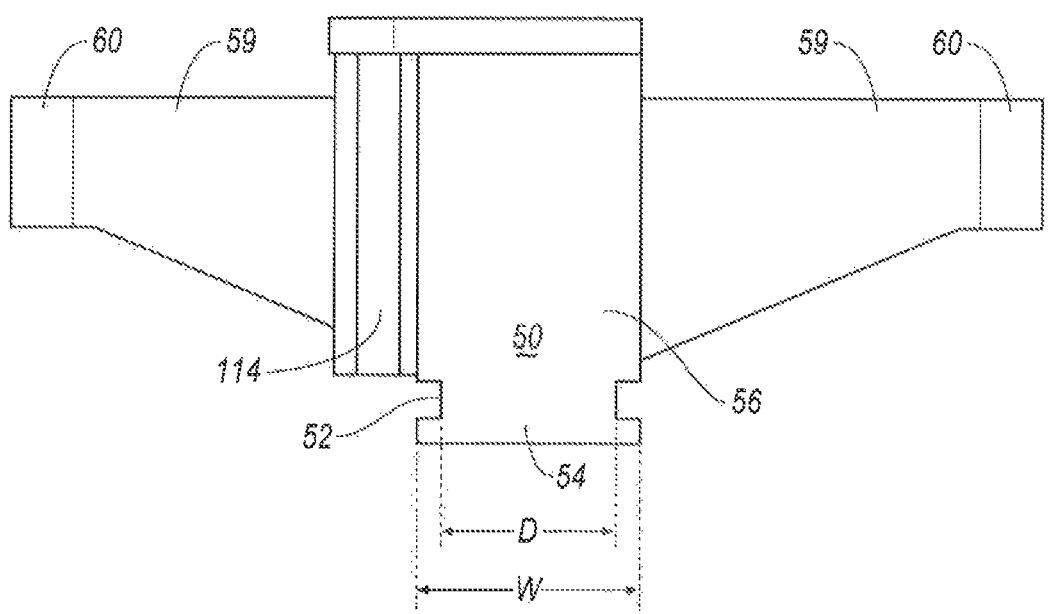
FIG. 5 is a top view of an example shoe mount that supports a brake shoe.

The windows 44 are configured to be received over a shoe mount 50. In this example, the shoe mount 50 is referred to as an abutment bar. The example abutment bar 50 is supported to remain in a stationary position relative to the suspension 32. FIG. 5 illustrates one example configuration of an abutment bar 50. Notches 52 are provided between a distal or end portion 54 and a more central portion 56 of the abutment bar 50. The width of the notches 52 is designed to correspond to a thickness of the web 40. The size of the opening in the first portion 46 of the window 44 corresponds to a width W of the end portion 54 so that the end portion 54 may be received through the first portion 46 of the window 44. The width of the second portion 48 of the window 44 corresponds to a distance D between the notches 52. In other words, the portion of the web 40 along the narrower portion 48 of the window 44 is received within the notches 52 when assembled.

With the web 40 situated relative to the abutment bar 50 in that manner, the brake shoe 22 may move in a radial direction to selectively apply a braking force to the inside surface of the drum 26. In this example, the shoe mount 50 restrains motion of the shoe 22 in two out of three dimensions while allowing movement in a third so that the brake can be applied as needed. The cooperation between the surfaces on the abutment bar 50 and the web 40 restrains rotational and axial movement of the brake shoe 22 while allowing radial movement to apply or release the brake.

Once the drum 26 is situated in place on the bearing flange 30, disassembling the brake shoes 22 off of the abutment bars 50 is not possible. Disassembly only becomes possible when the drum 26 has been removed.

Figure 6:
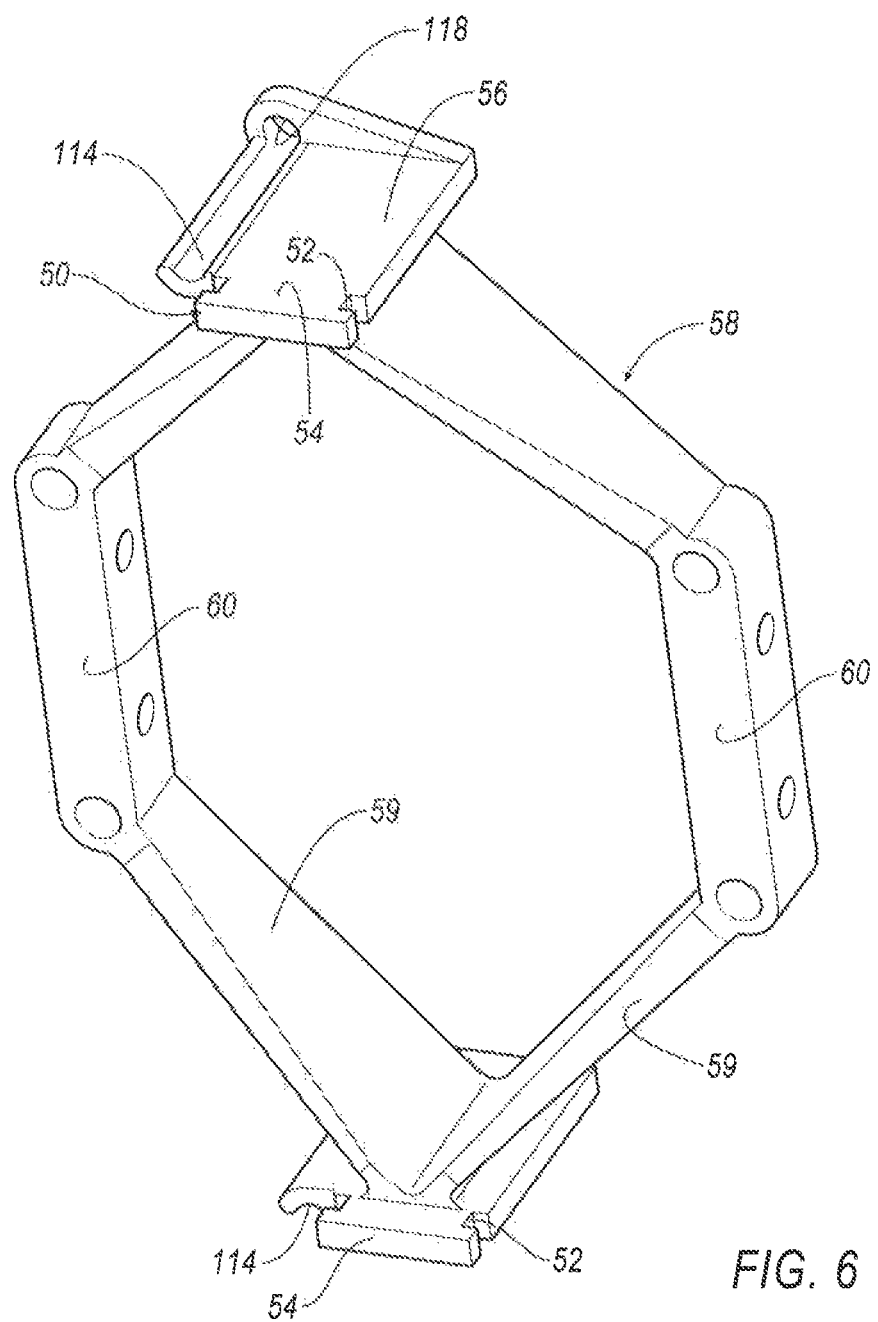
FIG. 6 is a perspective illustration of the shoe mount also shown in FIG. 5.

As can be appreciated from FIGS. 3 and 6, the abutment bars 50 are supported by a structure 58, which may be referred to as an anchor bracket or a torque reaction bracket. In this example, the supporting structure 58 comprises four linear load path members 59 that extend between the abutment bars 50 and connectors 60. The connectors 60 are secured to an axle flange 90 using threaded members 92 (e.g., bolts), for example.

The connection between the support structure 58 and the abutment bars 50 is strategically situated to be as close to the outboard end of the abutment bars 50 as possible without interfering with the brake shoes 22. In the illustrated example, the outboard surface on the load path members 59 is situated as close as possible to the inboard side of the corresponding brake shoe 22 (when the shoe is in an operative position within the assembly as shown in FIGS. 1 and 2).

Figure 4:
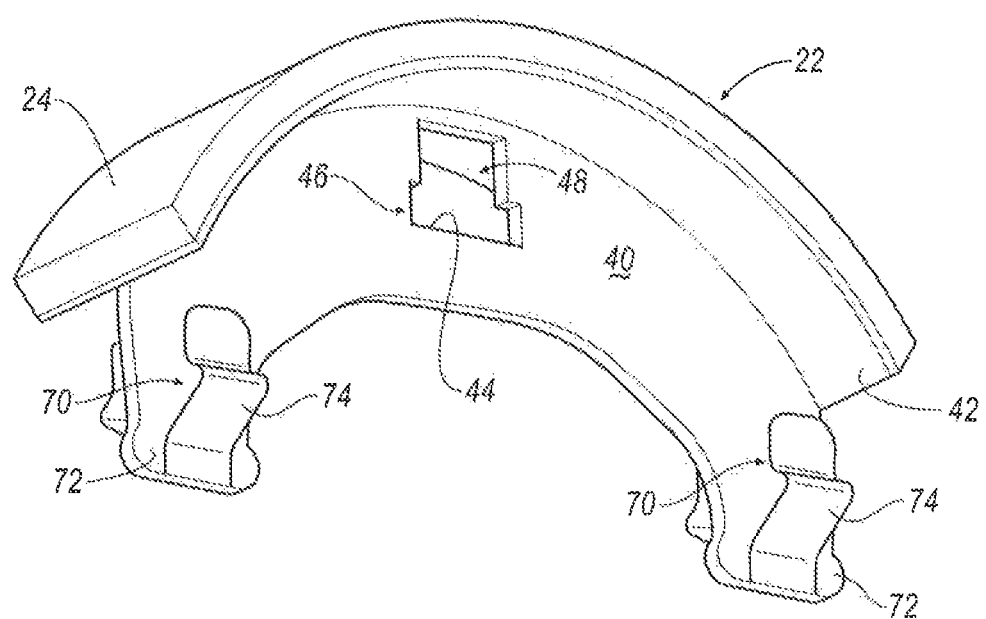
FIG. 4 is a perspective illustration of an example brake shoe.

As can be appreciated from FIGS. 4, 7A and 7B, the webs 40 include end portions 70 with contoured ends 72. The end portions 70 are at least partially received within wheel cylinder assemblies 80 that are supported to remain stationary relative to the suspension 32. As shown in FIGS. 2 and 7B, the example wheel cylinder assemblies 80 are each supported at the end of a plate 87 that is secured to a connector 60 using threaded members 88 (e.g., bolts).

Each wheel cylinder assembly 80 includes two pistons 82 that are activated during a brake application. The pistons 82 and the end portions 70 of the webs 40 have cooperating surfaces for holding the ends 72 within the corresponding pistons 82 in a selectively releasable manner. In this example, the end portions 70 include spring clips 74 that are resilient so that they can be moved toward or away from the surface of the end portion 70. Each of the pistons 82 includes a groove 84 near an open end of the structure of the piston 82. The groove 84 is configured to receive a portion of a clip spring 74 so that the end portions 70 of the webs 40 may be held in place as the springs 74 are effectively snapped into place within the wheel cylinder assemblies 80. FIG. 7B, is a cross-sectional view near an edge of the clip springs 74 in one embodiment in which the clip springs 74 are generally straight in a direction parallel to the web 40 of the brake shoe 22. In such an embodiment, the springs 72 engage the corresponding grooves 84 near the edges of the springs. In other embodiments, the springs 74 may have a rounded contour or a bowed, outwardly facing surface that engages a groove 84 along a substantial portion of the length of that outwardly facing surface.

FIG. 7B also shows seal members 86 for retaining the brake fluid within the wheel cylinders 80. The seals also serve the function of retraction of the brake shoe in a manner well known in disk brakes.

Figure 8A:
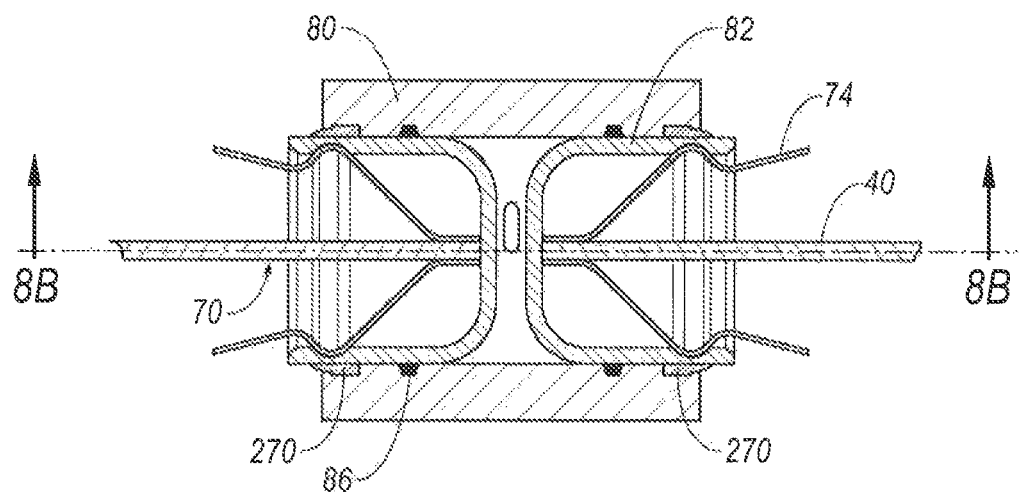
FIG. 8A is a cross-sectional illustration schematically showing how brake shoe webs are received in another cylinder embodiment from a first perspective.
Figure 8B:
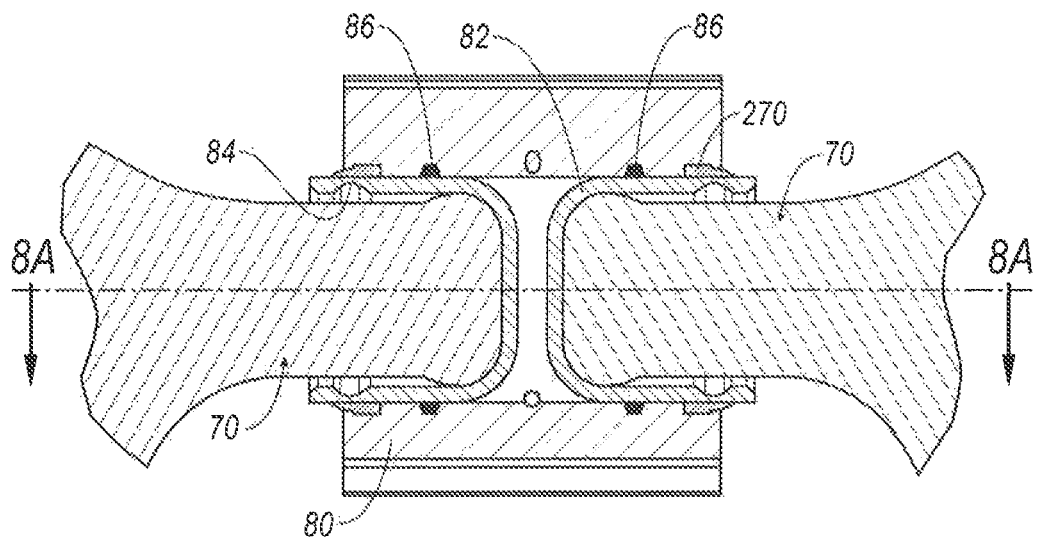
FIG. 8B is a cross-sectional illustration schematically showing the brake shoe webs and cylinder of FIG. 8A from a second, different perspective.
Figure 9:
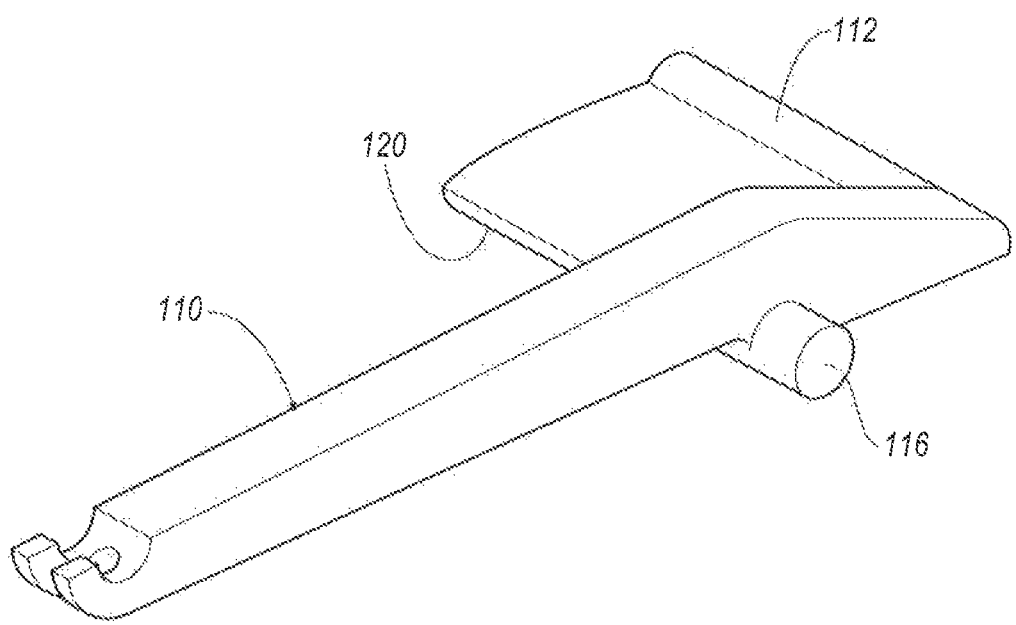
FIG. 9 is a perspective illustration of a parking brake lever component.

FIGS. 8A and 8B show another embodiment of the wheel cylinder assemblies 80. In this example, the pistons have rounded inner ends compared to the more squared-off edges in the embodiment shown in FIGS. 7A and 7B. The seals 86 are situated further into the wheel cylinder assembly and a scraper 87 is provided near the edge of the cylinder housing at the interface with the piston 82. The scrapers 87 prevent contaminants from entering the assembly. In one embodiment, the scrapers 87 comprise plastic rings fit into a groove on the cylinder 80 and is received against the outer surface on the piston 82, which comprises stainless steel in one example.

While the examples illustrated in FIGS. 7A-8B include a spring clip 74 on the web portions 40, other examples include other combinations of cooperating surfaces on the ends 72 and the pistons 82 to hold the ends of the brake shoes within the pistons 82 to facilitate assembling the brake drum device and to facilitate brake operation so that the brake shoes move based on movement of the pistons 82 within the cylinders 80.

As best appreciated from FIGS. 1-3, 6 and 9, the example embodiment provides a parking brake feature. An activator 100, such as a push-pull cable, is associated with a parking brake applier (e.g., pedal or handle) that is accessible to a driver. The activator 100 has an associated snap-in mounting feature 102 that connects with an end on a mounting bracket 104. The end of the cable in this example includes swaged cylindrical lugs 106 that are received against opposite sides on a lever 110. Geometrically similar lugs are permanently attached to the end of mounting bracket 104 and engage the other lever 110 in the same manner. Other embodiments may include a plug, ball, eye or other terminal member that is configured to cooperate with the lever 110 so that the end of the activator 100 remains in a desired position relative to the lever 110 and movement of the activator 100 cable results in movement of the lever 110. A tension force in the cable also results in an equal and opposite force in the cable housing which is transmitted through the mounting bracket 104 to the other lever 110 thus drawing the ends of the two levers 110 towards each other.

The lever 110 includes a pivot surface 120 (FIG. 9) that is received in a fulcrum surface 114 (FIG. 6) on the anchor bracket 58. In this example, the fulcrum surface 114 is established on the abutment bar 50. The lever 110 also includes a positioner 116 that is received in an opening 118 near the fulcrum surface 114.

An application surface 112 (FIG. 3) on the lever 110 is configured to engage the inside of the table 42 of a corresponding brake shoe 22 to apply the parking brake based on a driver engaging the brake through manipulation of the activator 100. The illustrated example includes one lever 110 for each brake shoe.

The parking brake components (i.e., the activator 100 with its snap-in mounting feature 102, mounting bracket 104, and the levers 110) may be included in a pre-assembled drum brake assembly when the modular pre-assembly approach described above is desired. Once the drum 26 is in place over the shoes 22, the parking brake components will be held in the desired, assembled condition, such as that shown in FIG. 2.

Figure 10:
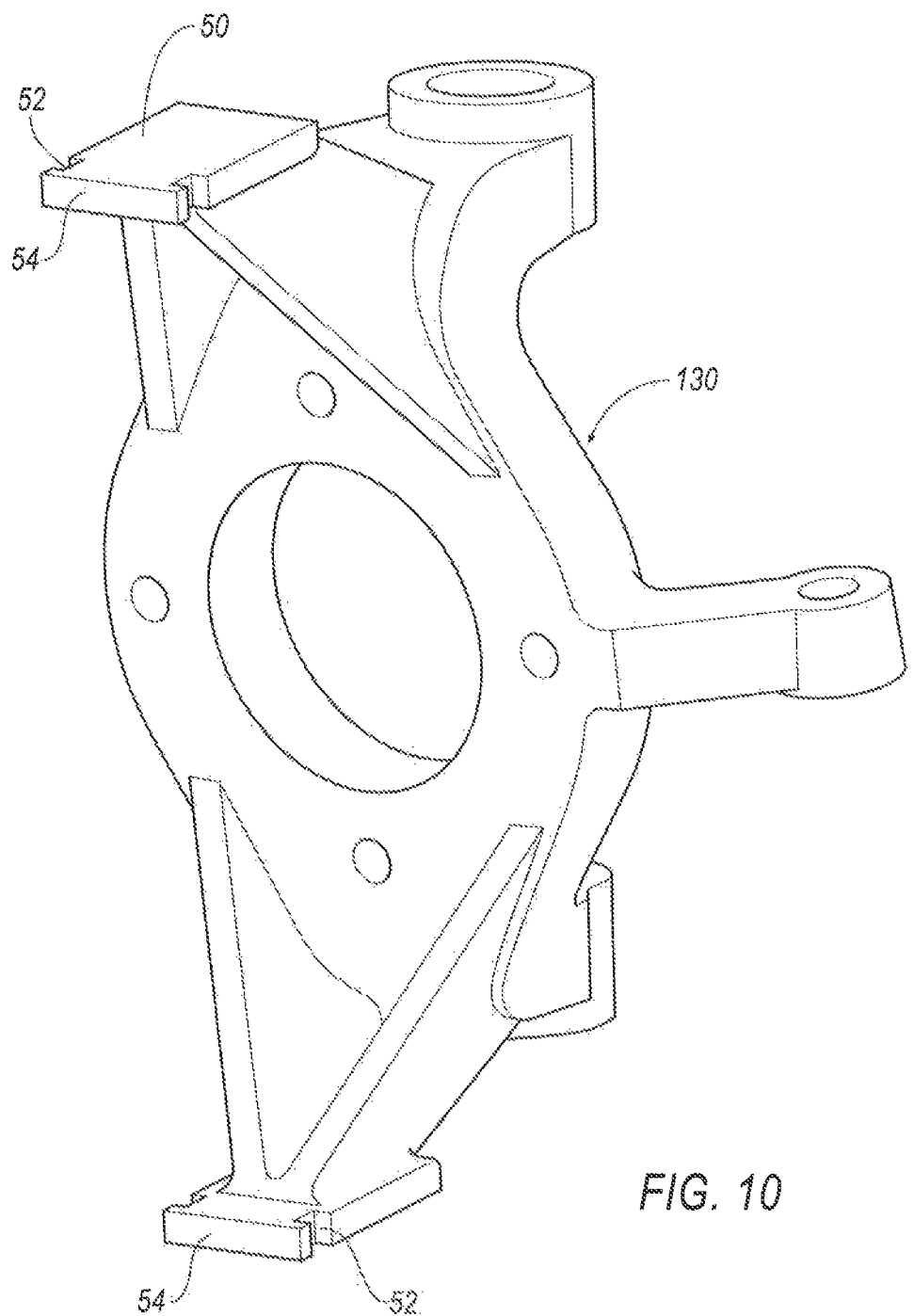
FIG. 10 is a perspective illustration of an example suspension component including integrated brake shoe mount features.

FIG. 10 shows an example suspension component 130, such as a knuckle casting. In this example, the abutment bars 50 are integrated into the suspension component 130. A separate anchor bracket 58 is not needed in such an embodiment. Other embodiments include integrating one or more features of the drum brake assembly into an axle or suspension component, such as a twist beam axle.

FIGS. 11-15 illustrate selected features of another embodiment. FIGS. 11A and 11B show this example from an outboard and inboard perspective, respectively. As shown in FIGS. 11A and 11B, the drum brake device 20' includes an outer rim 200 on the drum 26'. In one example embodiment, the outer rim 200 is made of aluminum and acts as a heat sink for absorbing and dissipating the friction generated heat resulting from aggressive brake use. Such a heat sink is particularly well-suited for high speed or high performance vehicles that may be driven at higher speeds and in a manner that requires braking often resulting in higher brake temperatures.

The outer rim 200 includes a plurality of air channels 202 to enhance the ability to transfer heat to the ambient air. The mass of the outer rim 200 is sufficient to quickly absorb heat and thus reduce the magnitude of heat spikes. The outer rim also stiffens the drum 26 in this embodiment.

Figure 11A:
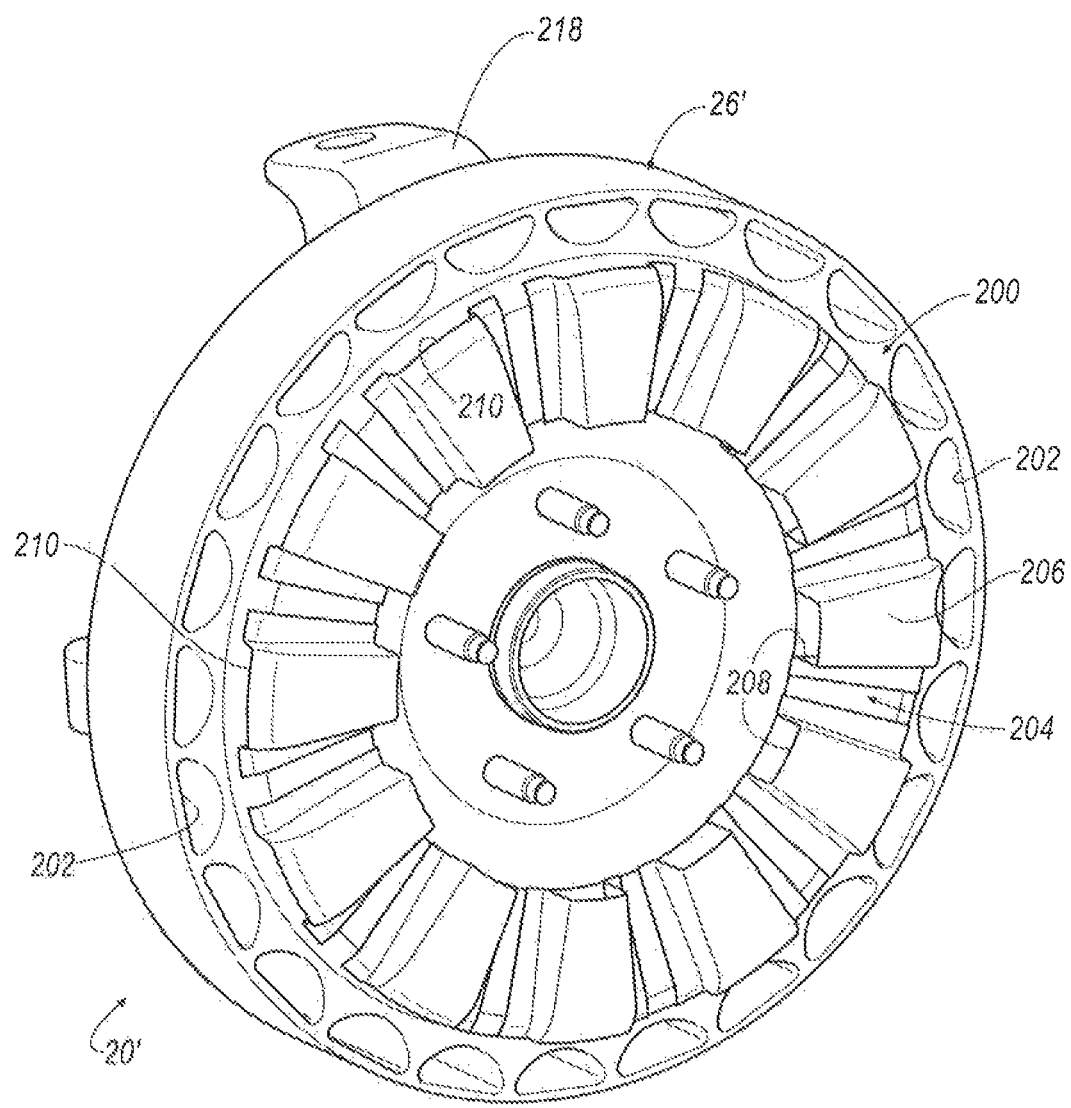
FIG. 11A is a perspective illustration of another example embodiment of a drum brake assembly.

As shown in FIG. 11A an outer end face 204 of the drum 26' includes a plurality of vane members that establish air flow passages 206. Openings 208 near radially inner ends operate as inlets to the flow passages 206. Openings 210 near radially outer ends of the passages 206 operate as outlets. During rotation of an associated vehicle wheel, the air flow passages 206 operate as a centrifugal fan and direct air toward the outer rim 200 and through the openings 202 to provide more effective cooling of the drum brake device 20'.

The outer face 204 may have a variety of appearances to provide a desired aesthetic effect when a particular wheel is mounted in place over the brake device. Many contemporary alloy wheel designs include openings through which brake components may be visible and the example outer face 204 allows for achieving a variety of looks. The outer face 204 may also serve as a splash guard to reduce the amount of liquid or contaminants that reach the interior of the drum 26'.

Figure 11B:
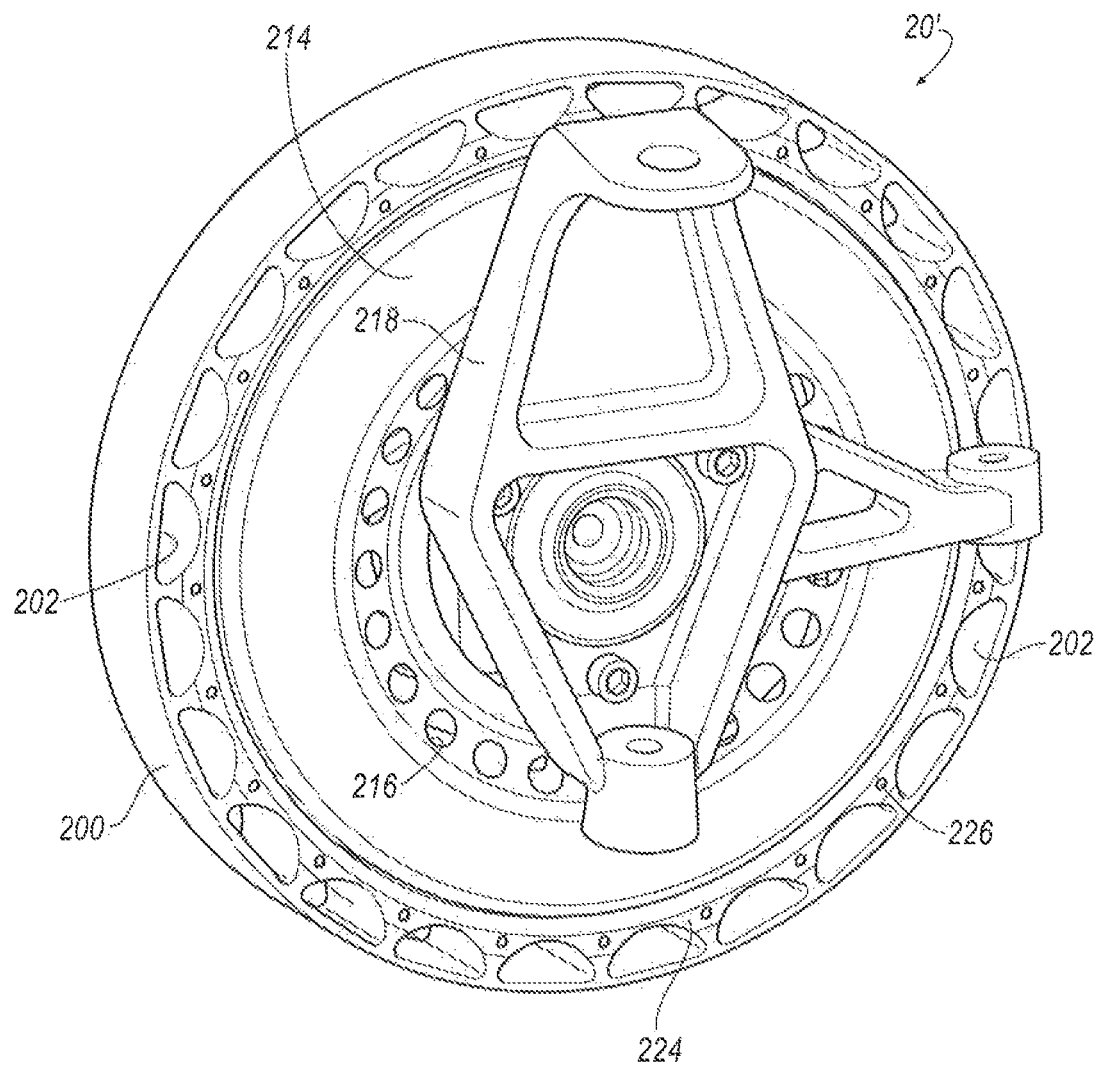
FIG. 11B shows the embodiment of FIG. 11A from a second, different perspective.

As can be appreciated from FIG. 11B, this example embodiment includes an inner cover plate 214 that serves to shield the interior of the drum brake device from exposure to water or contaminants that may be on a road surface. The inner cover plate 214 includes openings 216 to facilitate air flow within the drum 26' to assist in cooling the brake components. The inner cover plate 214 may be secured to the anchor bracket or otherwise securely situated relative to the steering knuckle 218 and the rest of the brake device 20' in the illustrated position.

Figure 12:
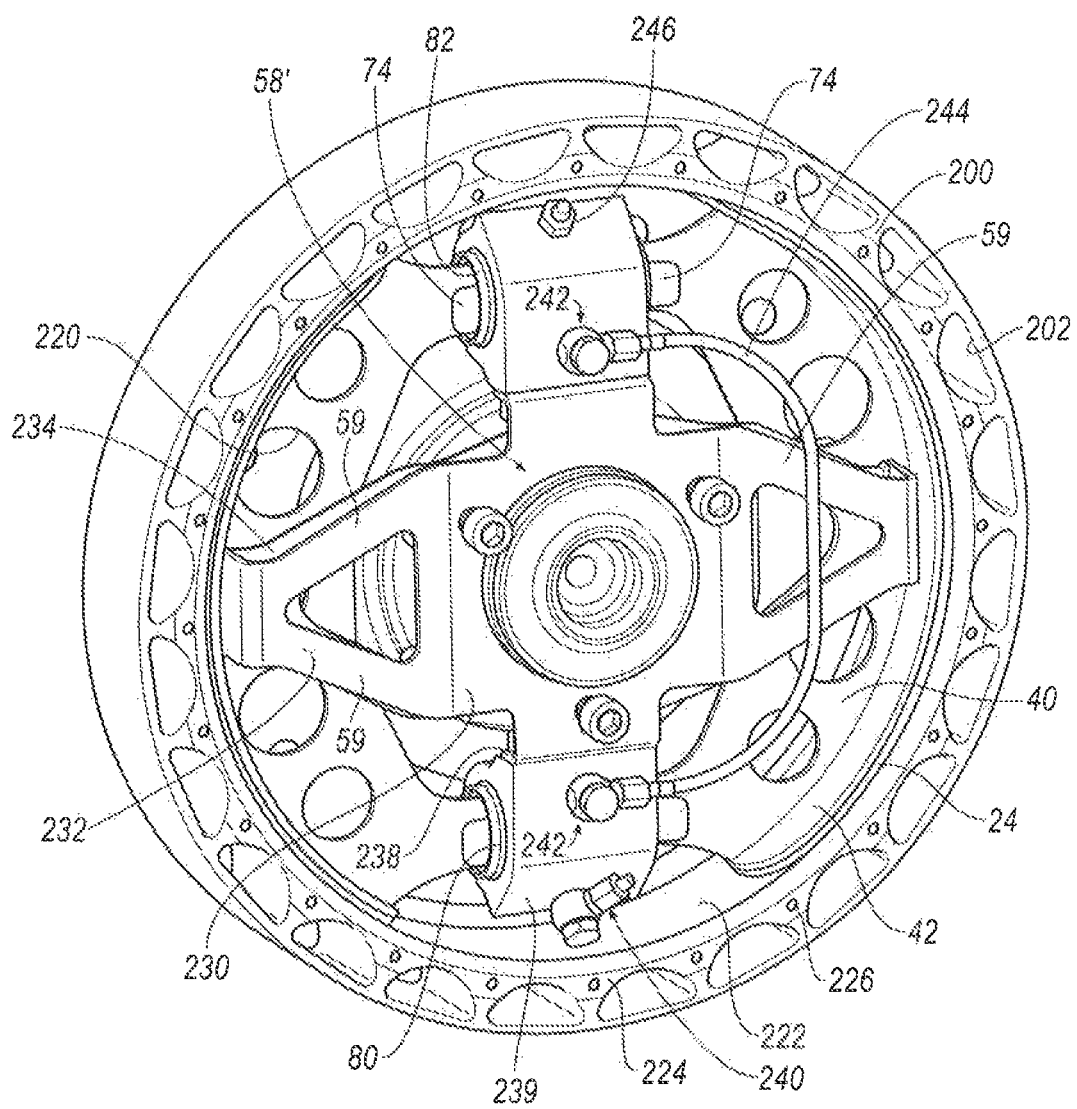
FIG. 12 shows selected features of the embodiment of FIGS. 11A and 11B from an inboard side.
Figure 13:
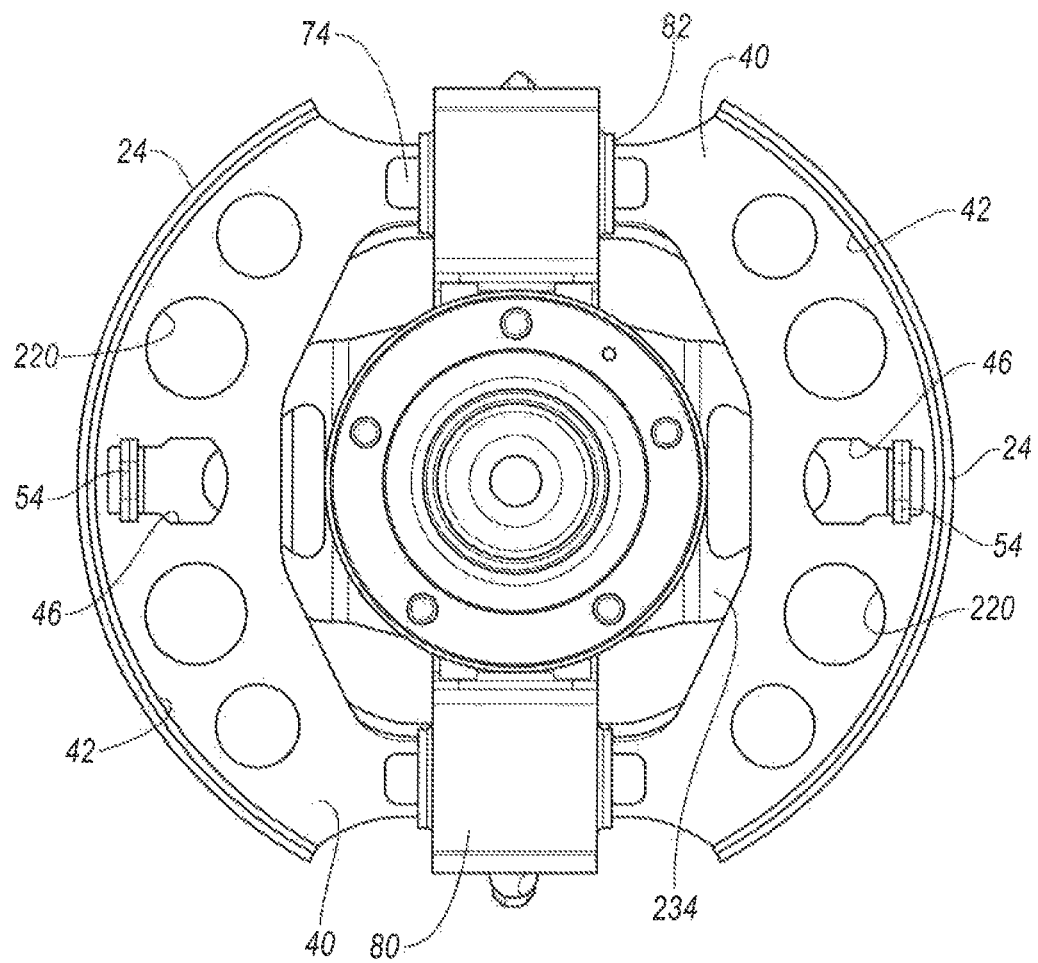
FIG. 13 shows selected features of the embodiment of FIGS. 11A and 11B from an outboard side.

FIG. 12 shows the brake device 20' with the inner cover plate 214 removed. FIG. 13 shows the components of FIG. 12 from the opposite side with the drum 26' and the cover 204 removed.

One feature of this embodiment visible in FIGS. 12 and 13 is that the webs 40 of the brake shoes include openings 220 that reduce the weight of the brake shoes and allow for increased airflow within the drum brake assembly.

The way in which the outer rim 200 is secured to the drum 26' is visible in FIG. 12. In this example, the drum includes an annular braking surface 222 and a flange 224 that is generally perpendicularly oriented relative to the braking surface 222. The outer rim 200 is received against and secured to the flange 224 by fasteners 226. As the outer rim 200 strengthens and stiffens the drum 26', the inner member of the drum that includes the braking surface 222 and the flange 224 may be made of a stainless steel stamping. Keeping the stamping thin facilitates heat transfer to the outer rim 200. One example includes a Nitronic® 30 stainless steel material that has advantageous abrasive wear resistance. With such a drum configuration, it becomes possible to realize cost savings compared to the cost of a conventional disc brake rotor.

The brake lining 24 in any disclosed embodiment may comprise a conventional brake friction material or a flame sprayed layer of ceramic alumina applied to the table 42. Flame spraying such a layer on a stainless steel table provides a brake shoe lining that yields a higher and more stable coefficient of friction compared to most automobile brake friction materials when interacting with the stainless steel braking surface 222. A conventional brake shoe friction material may have an associated coefficient of friction on the order of 0.4 while a ceramic alumina lining may have an associated coefficient of friction on the order of 0.6. The ceramic alumina lining is also capable of withstanding higher temperatures than conventional friction materials without degradation, and the ceramic alumina lining 24 is virtually wear-free which results in much less frequent brake service procedures than otherwise might be needed if conventional friction materials were utilized.

The supporting structure 58 of this embodiment differs from that discussed above in several respects. The supporting structure has a central support portion 230 and load path members 59 arranged to distribute loads as described above. The supporting structure 58 in this example includes two steel stampings 232 and 234 that are received against each other in the central support portion 230 but spaced from each other along at least a portion of the length of the load path members 59.

The central support portion 230 includes mounting edges 238 that provide mounting locations for wheel cylinders 239 that include a hydraulic fitting 240 which serves as an inlet port for hydraulic pressure from the vehicle brake system. Hydraulic fittings 242 and pressure tube 244 serve to interconnect the two wheel cylinders. A bleed valve 246 in the upper wheel cylinder assists in evacuating any trapped air in the two wheel cylinders.

Figure 14:
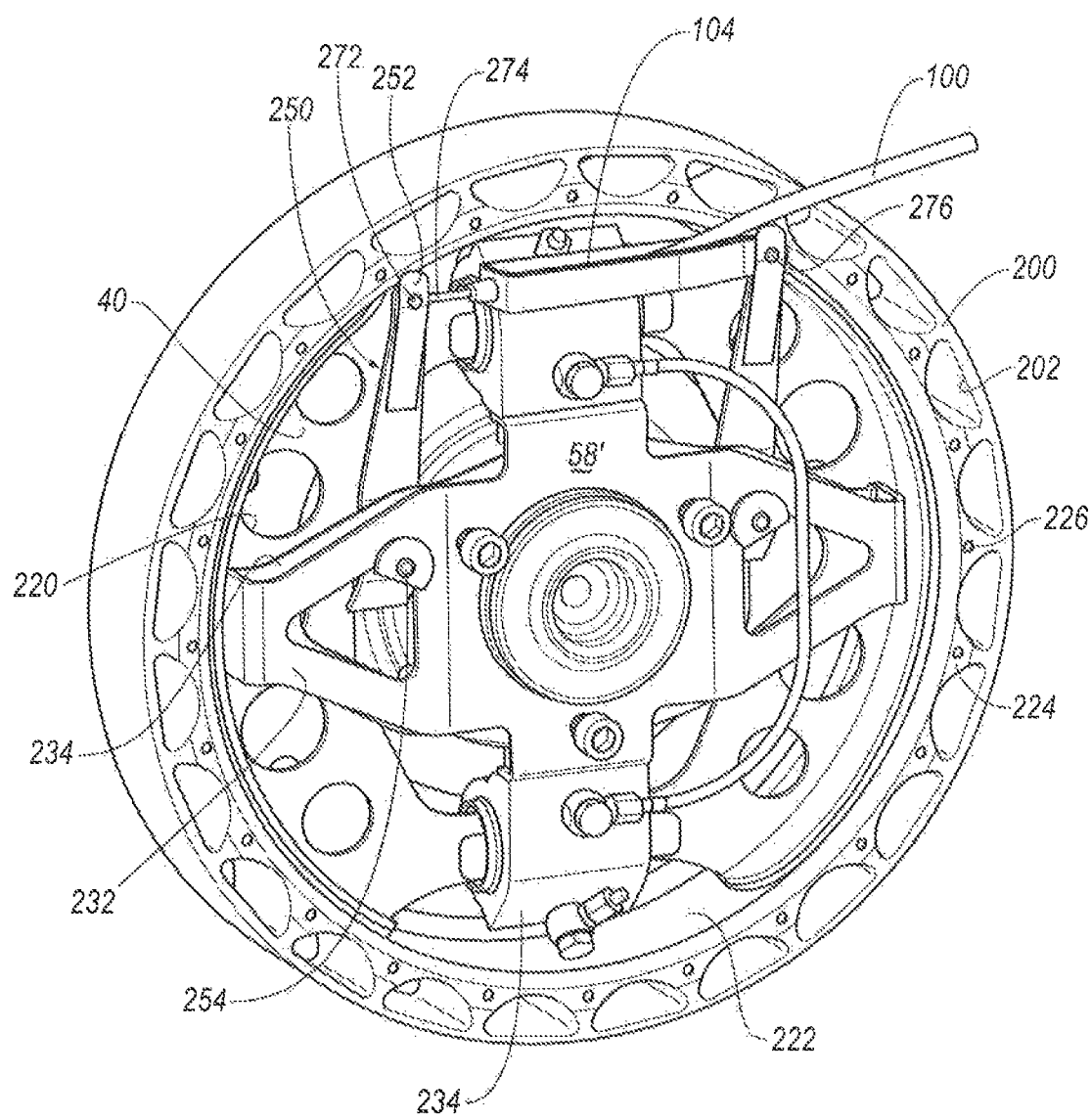
FIG. 14 is an illustration similar to FIG. 12 including parking brake components.
Figure 15:
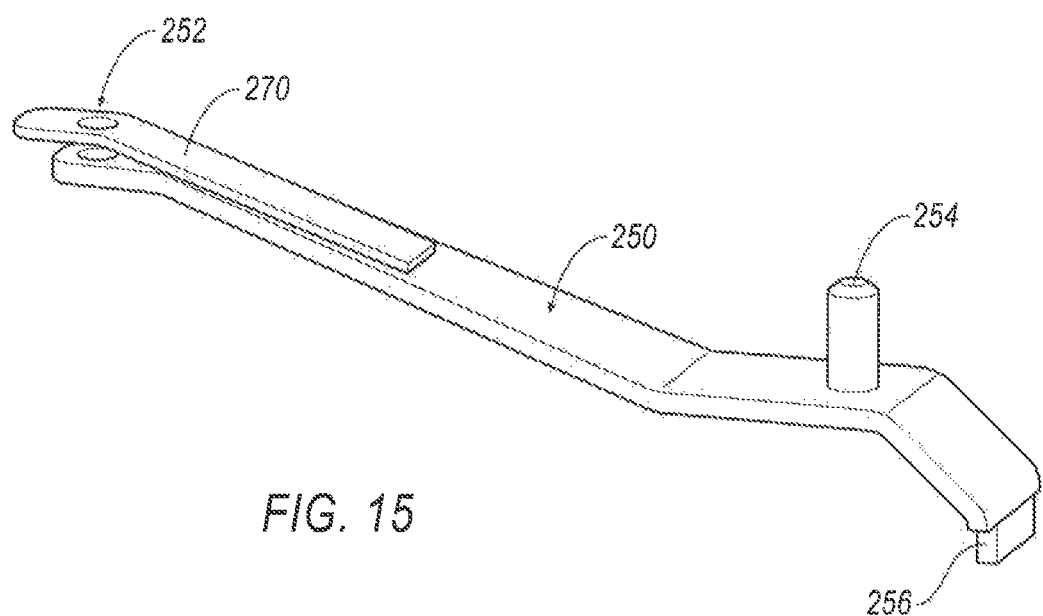
FIG. 15 is a perspective illustration of a parking brake lever component.

FIGS. 14 and 15 show a parking brake feature of this embodiment that differs in some respects from the parking brake described above. In this example, the activator 100 operates to cause movement of levers 250 in a manner that applies the parking brake by urging the shoes into engagement with the drum. In particular, the activator 100 urges ends 252 of the levers 250 to move about a pivot established by a post or boss 254 on the lever 250. As the ends 252 move inward (or toward each other in FIG. 14), opposite ends 256 press against the inner edges of the webs to force the brake shoes outward into engagement with the braking surface 222. The end 252 of lever 250 includes a spring retainer 270 which may be flexed to engage or release the cylindrical lug 272 attached to the end of the cable 274, and the geometrically similar lug 276 in the end of mounting bracket 104.

Figure 16:
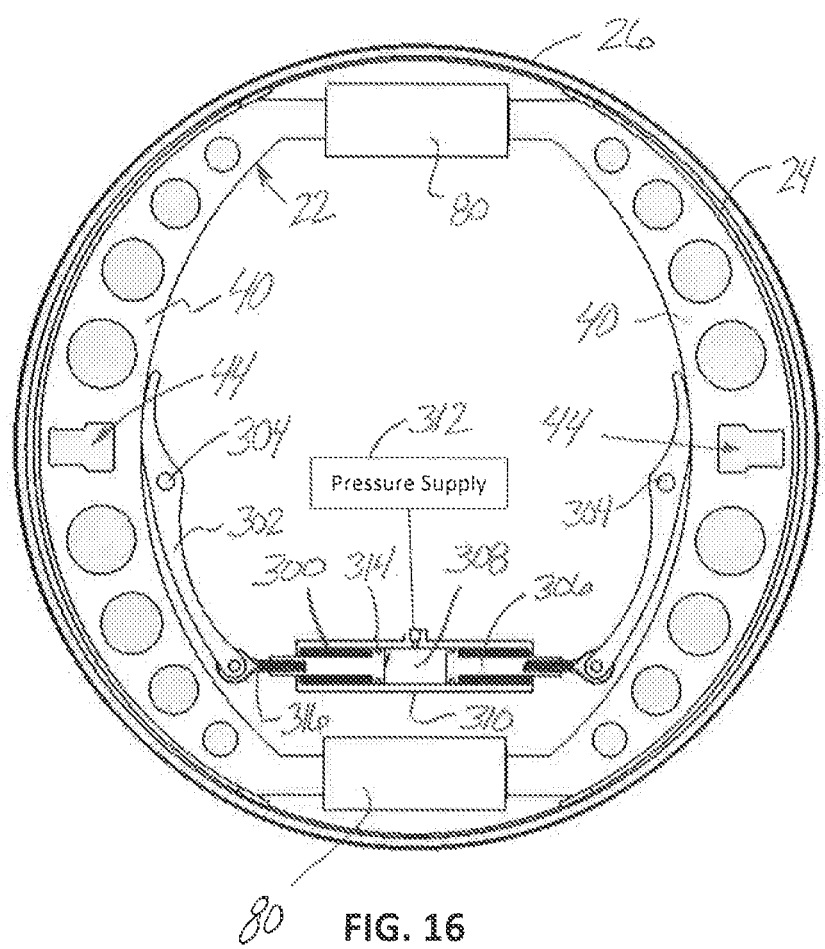
FIG. 16 illustrates another example parking brake embodiment.

FIG. 16 shows another parking brake embodiment. In this example, mechanical springs 300 act on levers 302 to urge the brake shoes 22 toward the drum 26 to apply a parking brake force. The levers 302 pivot about pivot shafts 304 that are mounted to the wheel knuckle (not illustrated in FIG. 16). The mechanical springs 300 bias the parking brake into engagement and provide a default parking brake applied state.

The springs 300 urge pistons 306 toward a central pressure chamber 308 within a cylinder 310. The chamber 308 is pressurized by a pressure source 312, which is a brake booster system in some embodiments. When adequate pressure from the source 312 is supplied to the chamber 308 to overcome the bias of the springs 300, the parking brake force is released and the drum 26 is able to rotate relative to the brake shoes 22. The pressure from the source 312 may automatically reach a sufficient level to overcome the spring force of the springs 300 whenever the brake booster system is activated and comes up to pressure. Whenever the brake booster system is deactivated the springs 300 set the parking brake.

Some embodiments include a solenoid valve (not illustrated) associated with the connection between the pressure source 312 and the chamber 308 to allow a driver to manually control when the parking brake will be applied.

Having a spring-applied, pressure-released parking brake allows for fail-safe operation of the parking brake. The illustrated embodiment also is configured to provide a parking brake force whenever a driver leaves the driver seat. For example, a seat sensor configured to detect the presence of a driver in a driver seat provides an indication whether the driver seat is occupied and whenever it is not occupied, the pressure in the chamber 308 is reduced to allow the springs 300 to apply the parking brake.

Figure 17:
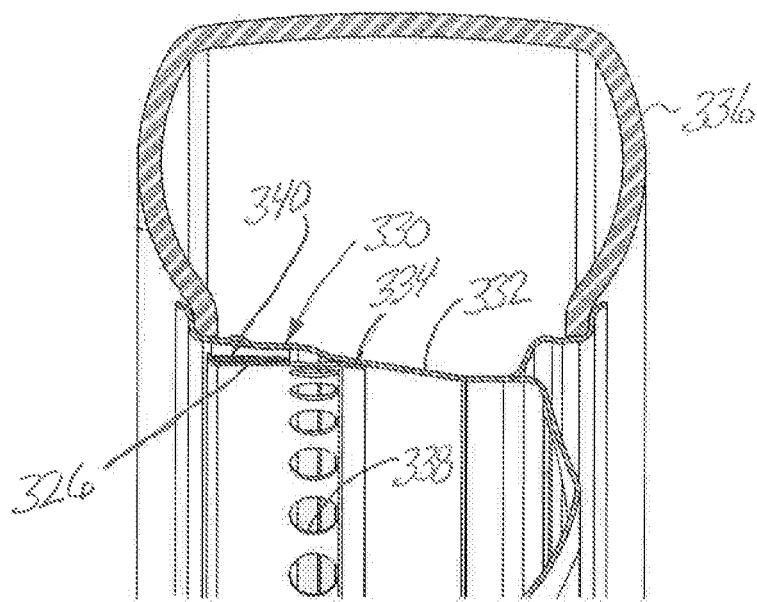
FIG. 17 illustrates selected features of another embodiment that includes an integrated drum brake and wheel.

FIG. 17 illustrates portions of an embodiment that includes a brake drum 326 integrated into a wheel and drum assembly 330. In this example, the brake drum 326 is welded to a wheel rim 332 at 334. Spot welding is used in the illustrated embodiment. The wheel rim 332 supports a tire 336 in a known manner.

The brake drum 326 in this embodiment includes air flow passages or openings 338 that facilitate air flow for cooling the drum 326 and the wheel rim 332 as the material of each is heated up as a result of brake application. In this example, the drum 326 and the wheel rim 332 comprise stainless steel.

The air flow openings 338 reduce the conductive heat path between the brake drum 326 and the wheel rim 332. The air flow openings 338 also allow air flow between the outer surface of the drum 326 and the inner surface of the wheel rim 332. This embodiment includes a heat sink 340 on the drum 326. The heat sink 340 comprises aluminum and includes grooves or channels that allow air flow along the heat sink 340 and through the openings 338.

An integrated wheel and drum assembly like that shown in FIG. 17 provides advantages, such as facilitating mounting electric motors within the wheel assembly. When combined with brake shoes designed according to an embodiment of this invention there are further advantages associated with easier assembly and installation of the wheel and brakes.

Assembling the drum brakes in the illustrated embodiments may be accomplished in the following manner. One or both of the brake shoes 22 is manipulated by hand (or automated machinery) into a position where the end portions 70 of the web 40 are situated just outside of or slightly interior of the wheel cylinder assemblies 80. The larger portion 46 of the window 44 is received over the end portion 54 of the abutment bar 50 and the web 40 is manipulated until the body of the web 40 is lined up with the notches 52 on the abutment bar 50. In that position, the brake shoe 22 may be manipulated in a radial direction toward the axis of rotation (of the wheel that will be eventually associated with the brake assembly) or slid inwardly toward the axis so that the end portions 70 move deeper into the wheel cylinders 80. More particularly, the contoured ends 70 are moved into the pistons 82 until the clip springs 74 engage the grooves 84. The clip springs 74 are effectively snapped into place within the pistons 82 to hold the webs 40 inside the pistons 82 so that the ends of the webs 40 are not going to move relative to the pistons 82 unless the clips springs 74 are manipulated (e.g., compressed inward toward the web 40). At the same time the portions of the web 40 on opposite sides of the window 44 are received into the notches 52. At that point, the brake shoe (or both shoes) is securely situated so that the drum 26 may be manipulated into position over the brake shoes 22 and secured in position (e.g., as shown in FIGS. 1 and 2).

Those skilled in the art will recognize that the assembly process provided by the example embodiments is significantly simpler and more fool-proof compared to that associated with a conventional drum brake arrangement. The various springs, clips, linkages and adjusters otherwise associated with assembling a conventional drum brake device have been eliminated. Additionally, the conventional backing plate typically included in a drum brake for structural support is no longer required, providing additional material cost savings and opportunities to realize a reduced weight.

The illustrated example embodiments allow for the drum brake assembly to be assembled in place on the end of an axle or suspension component in a piece-by-piece manner or by using a modular assembly approach. One example modular assembly approach includes pre-assembling at least the brake shoes 22, the wheel cylinders 80, and the anchor bracket 58. Some pre-assemblies include the parking brake levers 110. With this modular assembly approach, the pre-assembled drum brake assembly may be ready for installation onto an axle or suspension component on a vehicle assembly line (or axle or suspension sub-assembly line). This allows for reduced time and complexity along such an assembly line.

The anchor bracket 58 of the embodiment illustrated in FIGS. 1-6, for example, has a wide enough opening between the connectors 60 and inside of the linear load path members 59 to fit over a bearing flange 30 on the end of an axle 32 so that the connector 60 may be manipulated into position against an axle flange 90 where the connectors 60 can be secured in position using the threaded members 92 (e.g., bolts). Taking this approach allows for readily positioning the drum brake assembly in an operative position on the axle or suspension.

The assembly approaches useful with the disclosed embodiments are significantly less complex and time-consuming than the technique required to install a traditional drum brake assembly, which included mounting the backing plate in position and then arranging and connecting the various springs and other components required for the traditional assembly. Additionally, with the illustrated embodiment, no tools are required for assembly other than to tighten the threaded members 88 and 92. The remainder of the assembly may be done by hand. Of course, automated machinery may be used for any or all of the assembly process if desired.

Whether a modular, pre-assembly approach is utilized or the illustrated embodiments are assembled in place on an axle or suspension, the example embodiments present significant cost savings in terms of time and additional cost savings in materials and inventory because of the reduced number of components compared to a traditional drum brake assembly.

Disassembling the drum brake device 20 of either illustrated embodiment occurs in an opposite manner from the assembly process described above. After removing the drum 26, the ends of the clip springs 74 may be compressed manually or using an automated device and the brake shoe 22 may be slid radially outward until the abutment bar 50 is situated within the wider portion 46 of the window 44. At that point, the brake shoe can be tilted or otherwise moved away from the abutment bar 50 and the shoe 22 is easily removed and separated from the remainder of the assembly.

The illustrated embodiments demonstrate how a drum brake assembly designed according to an embodiment of this invention provides significant improvements over traditional drum brake assemblies. While different features or components are associated with the example embodiments, respectively, those features or components are not limited to that particular embodiment. One or more aspects or components of either embodiment may be used in a combination with components of the other embodiment. Any combination of the disclosed features is possible to realize other embodiments of a drum brake device designed according to this invention.

The preceding description is illustrative rather than limiting. Variations and modifications to the disclosed embodiments may become apparent to those skilled in the art that do not necessarily depart from the essence of this invention. The scope of legal protection over this invention can only be determined by studying the following claims.

I claim:

1. A method of assembling a drum brake device including at least one brake shoe having a friction lining on a support structure that moves with the friction lining during a brake application, a shoe mount, a brake actuating cylinder, and a drum having a braking surface inside the drum, the method comprising:
    positioning a portion of the support structure near the brake actuating cylinder;
    manipulating the support structure
        to cause a window through the support structure to receive a portion of the shoe mount and
        to place the support structure in a first position relative to the shoe mount wherein the support structure is removable from the shoe mount;
    moving the support structure relative to the shoe mount
        to couple the portion of the support structure with the brake actuating cylinder and
        to place the support structure in a second position relative to the shoe mount wherein the support structure is not removable from the shoe mount and the support structure is engaged by the shoe mount in a manner that the shoe mount restricts movement of the brake shoe in two dimensions and allows selective movement in a third dimension; and
    placing the drum into an installed position over the brake shoe with the braking surface facing the friction lining, wherein the support structure is prevented from moving from the second position into the first position when the drum is in the installed position.

2. The method of claim 1, wherein
    manipulating the support structure comprises tipping the web toward the shoe mount; and
    moving the support structure relative to the shoe mount comprises sliding the web over the portion of the shoe mount in a direction that is parallel to a direction of movement of the web for brake application.

3. The method of claim 1, comprising
pre-assembling a brake shoe assembly by performing the positioning, the manipulating and the moving; and
subsequently installing the pre-assembled brake shoe assembly onto a vehicle suspension component.

4. The method of claim 1, wherein the drum is part of an integrated wheel and drum assembly including a wheel rim secured to the drum.

5. A drum brake device, comprising:
at least one brake shoe including a friction lining and a support structure that moves with the friction lining during a brake application, the support structure including a window having a first portion and a second portion, the first portion of the window being wider than the second portion; and
a shoe mount including a portion that is configured to be received through and removable from the first portion of the window when the support structure is in a first position relative to the shoe mount, the portion of the shoe mount engages the support structure adjacent the second portion of the window in a manner that resists movement of the brake shoe in two dimensions and allows selective movement of the brake shoe in a third dimension for allowing the friction lining to selectively engage the braking surface when the support structure is in a second position relative to the shoe mount, wherein the support structure is not removable from the shoe mount while the support structure is in the second position.

6. The drum brake device of claim 5, comprising a drum including an inner, braking surface and wherein the drum prevents the support structure from moving from the second position into the first position when the drum is in an installed position with the friction lining facing the braking surface.

7. The drum brake device of claim 6, wherein the first portion of the window is situated closer to an axis of rotation of the drum than the second portion of the window.

8. The drum brake device of claim 6, wherein
the brake shoe is a first distance from an axis of rotation of the drum when the support structure is in the first position;
the brake shoe is a second distance from the axis of rotation when the support structure is in the second position; and
the first distance is greater than the second distance.

9. The drum brake device of claim 6, comprising an integrated wheel and drum assembly including a wheel rim secured to the drum.

10. The drum brake device of claim 9, wherein the drum is welded to the wheel rim.

11. The drum brake device of claim 6, wherein
the shoe mount includes notches;
the support structure adjacent each of two sides of the second portion of the window is received in the notches;
engagement between the support structure and the notches prevents movement of the brake shoe in a rotational direction corresponding to rotation of the drum;
movement in the rotational direction corresponds to movement in one of the two dimensions;
engagement between the support structure and the notches prevents movement of the brake shoe in an axial direction parallel to an axis of rotation of the drum;
movement in the axial direction corresponds to movement in the other of the two dimensions; and
engagement between the support structure and the notches allows movement of the brake shoe in a brake applying direction that corresponds to movement in the third dimension.

12. The drum brake device of claim 6, wherein
the drum comprises an inner portion and an outer rim;
the inner portion has the inner, braking surface;
the outer rim includes a plurality of openings that are configured to accommodate air flow through the openings to facilitate reducing a temperature of at least the drum.

13. The drum brake device of claim 5, wherein
the shoe mount comprises a central support portion and load path members;
the shoe mount comprises two metal stampings that are received against each other in the central support portion and spaced from each other along at least a portion of a length of the load path members.

14. The drum brake device of claim 5, comprising a spring-applied, pressure-released parking brake.

15. The drum brake device of claim 5, wherein the first portion of the window is radially inward of the second portion of the window.

16. The drum brake device of claim 5, wherein
the support structure comprises a table and a web;
the friction lining is secured to the table;
the web is generally perpendicular to a surface of the friction lining that is configured to contact the braking surface of the drum; and
the window is on the web.

17. The drum brake device of claim 16, wherein
there are two brake actuating cylinders including pistons configured to move for actuating the brake device;
ends of the web are received into the cylinders, respectively; and
the ends of the web and the pistons include cooperating surfaces for selectively holding the ends of the web inside the pistons.

18. The drum brake device of claim 17, wherein the cooperating surfaces comprise at least one spring clip and at least one groove.

* * * * *